（12） United States Patent
Klingbeil et al.

(10) Patent No.: US 11,905,877 B2
(45) Date of Patent: Feb. 20, 2024

(54) METHODS AND SYSTEMS FOR MULTI-FUEL ENGINE

(71) Applicant: Transportation IP Holdings, LLC, Norwalk, CT (US)

(72) Inventors: Adam Klingbeil, Ballston Lake, NY (US); Thomas Michael Lavertu, Ballston Lake, NY (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 18/170,377

(22) Filed: Feb. 16, 2023

(65) Prior Publication Data

US 2023/0193810 A1    Jun. 22, 2023

Related U.S. Application Data

(60) Continuation-in-part of application No. 17/643,346, filed on Dec. 8, 2021, and a continuation-in-part of
(Continued)

(51) Int. Cl.
*F02B 43/10* (2006.01)
*F02D 19/06* (2006.01)
(Continued)

(52) U.S. Cl.
CPC ............... *F02B 3/08* (2013.01); *F02B 43/10* (2013.01); *F02B 43/12* (2013.01); *F02D 19/061* (2013.01); *F02D 19/0644* (2013.01); *F02D 19/0692* (2013.01); *F02D 19/105* (2013.01); *F02D 29/02* (2013.01); *F02D 35/027* (2013.01); *F02D 41/0025* (2013.01); *F02D 41/401* (2013.01); *F02D 41/008* (2013.01); *F02D 41/3047* (2013.01); *F02M 26/05* (2016.02);
(Continued)

(58) Field of Classification Search
CPC .... F02B 43/10; F02B 43/12; F02B 2043/103; F02B 2043/106; F02D 19/0642; F02D 19/0644; F02D 19/08; F02D 19/081; F02D 19/10; F02D 41/0027
USPC .... 123/DIG. 12, 27 GE, 299, 304, 525, 526, 123/575, 577
See application file for complete search history.

(56) References Cited

U.S. PATENT DOCUMENTS 6,269,791 B1 * 8/2001 Tanaka ............... F01N 13/009
123/568.21
8,794,212 B2 * 8/2014 Klingbeil ............ F02D 41/0027
123/299

(Continued)

OTHER PUBLICATIONS

Klingbeil, A. et al., "Methods and Systems for Multi-Fuel Engine," U.S. Appl. No. 17/643,346, filed Dec. 8, 2021, 57 pages.

*Primary Examiner* — Erick R Solis
(74) *Attorney, Agent, or Firm* — McCoy Russell LLP

(57) ABSTRACT

Methods and systems are provided for adjusting a location of a fuel injection in response to a substitution rate and a desired EGR flow. In one example, a method may include injecting a first fuel to a combustion chamber via a direct injector positioned to inject directly into the combustion chamber, injecting a second, different, fuel to the combustion chamber via an exhaust port injector positioned to inject toward an exhaust valve of the combustion chamber, and combusting the first and second fuels together in the combustion chamber.

20 Claims, 6 Drawing Sheets

Related U.S. Application Data application No. 17/449,641, filed on Sep. 30, 2021, now Pat. No. 11,668,218, and a continuation-in-part of application No. 17/447,268, filed on Sep. 9, 2021, now Pat. No. 11,585,262, which is a continuation-in-part of application No. 15/889,662, filed on Feb. 6, 2018, now Pat. No. 11,143,090, which is a division of application No. 14/190,482, filed on Feb. 26, 2014, now Pat. No. 9,920,683.

(51) Int. Cl.

| | |
|---|---|
| *F02D 19/08* | (2006.01) |
| *F02B 3/08* | (2006.01) |
| *F02D 41/40* | (2006.01) |
| *F02D 35/02* | (2006.01) |
| *F02D 41/00* | (2006.01) |
| *F02D 19/10* | (2006.01) |
| *F02D 29/02* | (2006.01) |
| *F02B 43/12* | (2006.01) |
| *F02D 41/30* | (2006.01) |
| *F02M 26/43* | (2016.01) |
| *F02M 26/05* | (2016.01) |
| *F02M 26/23* | (2016.01) |

(52) U.S. Cl.
CPC ............ *F02M 26/23* (2016.02); *F02M 26/43* (2016.02); *Y02T 10/30* (2013.01); *Y02T 10/40* (2013.01)

(56) References Cited

U.S. PATENT DOCUMENTS

| | | | |
|---|---|---|---|
| 9,920,683 B2 | 3/2018 | Yerace et al. | |
| 2001/0015193 A1* | 8/2001 | Tanaka | F02D 41/0055 123/568.21 |
| 2011/0132326 A1* | 6/2011 | Leone | F02D 19/0628 123/436 |
| 2011/0247584 A1* | 10/2011 | Gentile | F02M 69/042 123/294 |
| 2011/0259290 A1 | 10/2011 | Michikawauchi et al. | |
| 2012/0216780 A1* | 8/2012 | Gentile | F02M 69/046 123/470 |
| 2013/0291841 A1 | 11/2013 | Fukuyama et al. | |
| 2014/0325963 A1* | 11/2014 | Nagaoka | F02D 41/0245 60/299 |
| 2021/0404371 A1 | 12/2021 | Yerace et al. | |

\* cited by examiner

METHODS AND SYSTEMS FOR MULTI-FUEL ENGINE

CROSS REFERENCE TO RELATED APPLICATIONS

The present application is a continuation-in-part of U.S. Non-Provisional patent application Ser. No. 17/449,641, filed on Sep. 30, 2021; U.S. Non-Provisional patent application Ser. No. 17/643,346, filed on Dec. 8, 2021; and U.S. Non-Provisional patent application Ser. No. 17/447,268, filed on Sep. 9, 2021. U.S. Non-Provisional patent application Ser. No. 17/447,268 is a continuation-in-part of U.S. Non-Provisional patent application Ser. No. 15/889,662, filed on Feb. 6, 2018, which is a divisional of U.S. Non-Provisional patent application Ser. No. 14/190,482, filed on Feb. 26, 2014. The entire contents of the above-listed applications are hereby incorporated by reference for all purposes.

BACKGROUND

Technical Field

Embodiments of the subject matter disclosed herein relate to a multi-fuel engine, and more specifically, to adjusting operating conditions to enhance combustion of certain fuel types by adjusting fuel injection locations and timing.

Discussion of Art

Internal combustion engines may include compression-ignition and/or spark-ignition engines. The engine may combust multiple types of fuel. The engine may include multiple injectors positioned to inject directly into a combustion chamber and into an intake port of the engine. A substitution rate of the fuel may be adjusted to adjust engine power output, emissions, engine temperature, and so forth. Some fuels, while energy dense, may be prone to generating poor combustion conditions due to a high heat of vaporization, poor mixing, and/or low flame speed. It may therefore be desirable to have methods and systems for fuel combustion which differ from those that are currently available.

BRIEF DESCRIPTION

In one embodiment, a method may include injecting a first fuel to a combustion chamber via a direct injector positioned to inject directly into the combustion chamber, injecting a second, different, fuel to the combustion chamber via an exhaust port injector positioned to inject toward an exhaust valve of the combustion chamber, and combusting the first and second fuels together in the combustion chamber. An exhaust valve timing may be adjusted to increase an exhaust gas re-ingestion. The method may further include injecting the second fuel into an exhaust gas recirculation (EGR) passage via an EGR passage injector. The EGR passage injector may be arranged near a junction between the EGR passage and an exhaust gas passage. An amount of second fuel injected by the EGR passage injector may be based on a desired EGR cooling and a current substitution rate. In one example, cooling of the EGR in the EGR passage may be provided via only the injection from the EGR passage injector. Injecting the first fuel may include a first injection during an intake stroke and a second injection during a compression stroke of the combustion chamber.

In one embodiment, a system is provided that includes a first fuel system configured to supply a first fuel directly into a combustion chamber; a second fuel system configured to supply a second fuel from outside of the combustion chamber and subsequently into the combustion chamber; and a controller with instructions stored on non-transitory memory. The instructions may cause the controller to determine a substitution ratio based at least in part on an engine load and an exhaust gas recirculation (EGR) demand; and to adjust an exhaust valve timing to control an ignitability value of a combustion mixture including the first fuel and the second fuel.

In one embodiment, a system of a vehicle is provided. The system may include an engine comprising a plurality of cylinders including at least one intake valve and at least one exhaust valve; a first fuel system operable to deliver a first fuel to the plurality of cylinders via a plurality of direct injectors; a second fuel system operable to deliver a second fuel to the plurality of cylinders via a plurality of second fuel injectors located at different sections of an intake system and an exhaust gas recirculation (EGR) portion of an exhaust system; and a controller with computer-readable instructions stored on non-transitory memory. The controller can select a substitution ratio based at least in part on an engine load; and adjust an EGR routing and a location of an injection of the second fuel at least as a partial response to an ignitability value of a combustion mixture of a cylinder of the plurality of cylinders.

DETAILED DESCRIPTION

Figure 1:
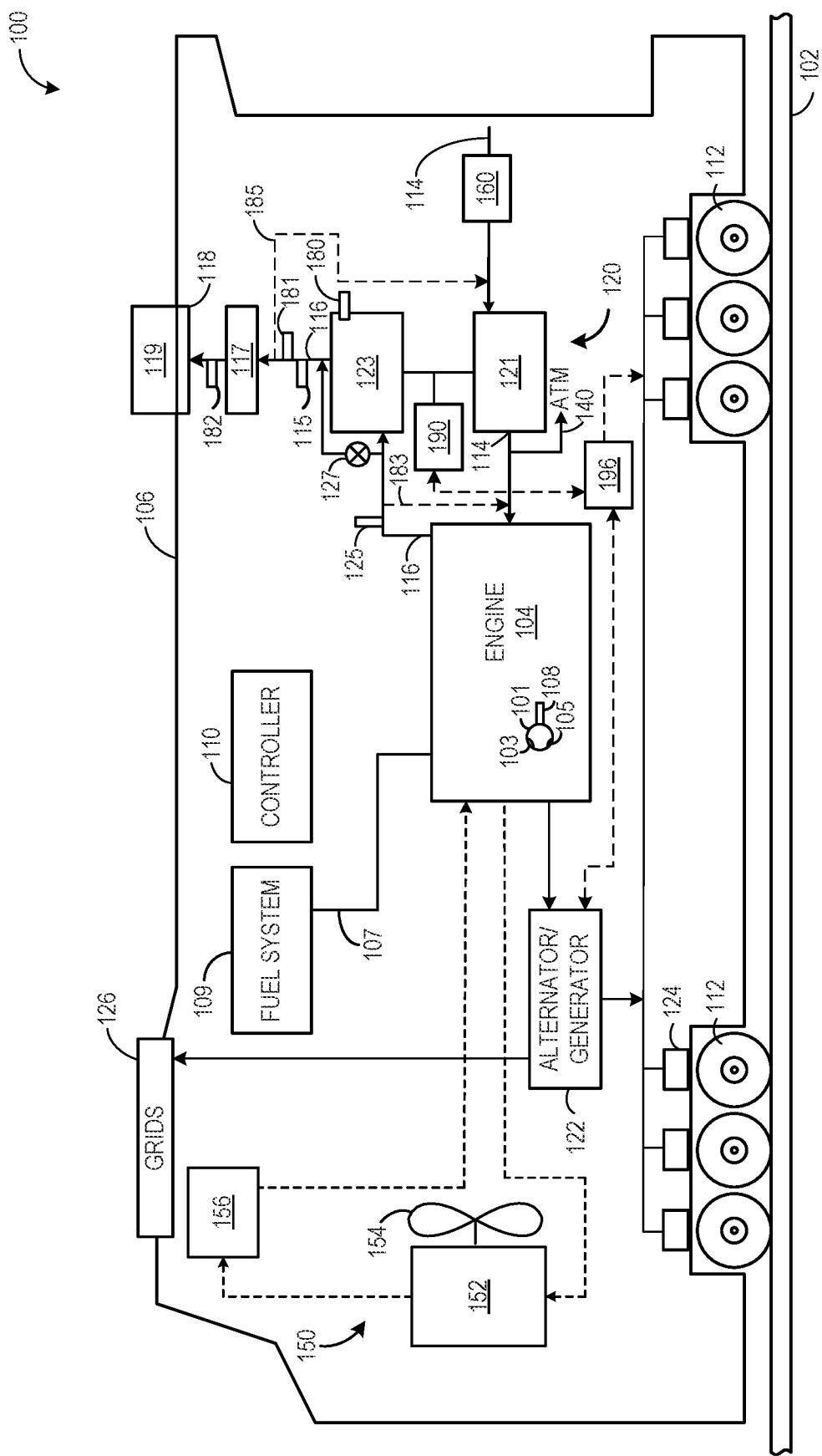
FIG. 1 shows a schematic diagram of a vehicle system with an engine

Embodiments of the invention are disclosed in the following description, and may relate to methods and systems for increasing performance of an internal combustion engine (ICE). The ICE may operate via a combination of different fuels. These fuels may have relatively different amounts of carbon. In one example, the ICE may be a multi-fuel engine configured to combust a plurality of fuels. The ICE may combust one or more of gasoline, diesel, hydrogenation-derived renewable diesel (HDRD), alcohol, ammonia, bio-diesels, hydrogen, natural gas, kerosene, syn-gas, and the like. The plurality of fuels may include gaseous fuels and liquid fuels, alone or in combination. A substitution rate of a primary fuel of the ICE with a secondary fuel may be determined based on a current engine load. In one embodiment, the substitution rate may correspond to an injection amount of a fuel with a relatively lower carbon content or zero carbon content (e.g., hydrogen gas). As the substitution rate increases, the relative proportion of fuel with the lower or zero carbon content increases and the overall amount of carbon content in the combined fuel lowers.

In one example, the ICE may combust fuels that include both diesel and ammonia. During some operating modes, the ICE may combust only diesel, only ammonia, or a combination thereof (e.g., during first, second, and third conditions, respectively). When ammonia is provided, operating conditions may be adjusted to promote enhanced combustion of the ammonia. More specifically, an engine configuration of the ICE may be adjusted to advantageously arrange one or more ammonia injectors in various locations where ammonia may premix with hot exhaust gases without increasing engine or intake manifold temperatures to vaporize the ammonia. For example, an injector may be positioned in an exhaust port and may inject ammonia toward an exhaust valve of a combustion chamber. In some examples, the exhaust valve opening and closing may be delayed to increase exhaust gas re-ingestion when the ammonia is injected to the exhaust port. Exhaust gas re-ingestion may include where exhaust gases expelled from the combustion chamber are sucked back into the combustion chamber by maintaining the exhaust valve open during the intake stroke. Exhaust gas retention may include where the exhaust valve timing is adjusted to decrease an amount of exhaust gas expelled from the cylinder by closing the exhaust valve before a completion of an exhaust stroke. Both exhaust gas re-ingestion and exhaust gas retention may affect an exhaust gas recirculation (EGR) flow rate. The exhaust gas used in the exhaust gas re-ingestion and the exhaust gas retention may have a higher temperature relative to EGR from an EGR passage as less heat is lost to various engine materials and an ambient atmosphere. The highest exhaust gas temperatures may vaporize the ammonia, which may enhance a combustibility thereof. Other operating adjustments may include activating a donor cylinder, premixing diesel with ammonia via an advanced diesel injection timing, and/or injecting ammonia directly into an EGR stream. Various examples and routines for promoting ammonia combustion are described herein.

Embodiments of the system described herein may include a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, aircrafts, rail vehicles, and other off-highway vehicles (OHVs). For clarity of illustration, a rail vehicle such as a locomotive may be provided as an example of a mobile platform. In one example, a vehicle system may include an engine, a turbocharger, an aftertreatment system, a fuel system, and a control system.

FIG. 1 shows an embodiment of a vehicle system 100 (e.g., an engine system). In the illustrated embodiment, an engine 104 (e.g., an internal combustion engine) is coupled to a vehicle which is depicted as a rail vehicle (e.g., a locomotive). The vehicle may run on a rail 102 via a plurality of wheels 112. As depicted, the vehicle may include the engine. In another embodiment, the vehicle system may be disposed in an on-road vehicle such as an automobile or a truck. In still other embodiments, the vehicle system may include a marine vessel, mining equipment, agricultural equipment, industrial equipment, off-highway vehicle propulsion systems, or any other equipment that relies on tractive effort generated by a combination of one or more engines and one or more motors. In other non-limiting embodiments, the engine may be in a stationary platform.

The engine may include a plurality of cylinders 101 (only one representative cylinder shown in FIG. 1) that each include at least one intake valve 103, at least one exhaust valve 105, and at least one fuel injector 108. Each intake valve, exhaust valve, and fuel injector may include an actuator that may be actuated via a signal from a controller 110 of the engine. The cylinders of the engine may receive fuel from a fuel system 109 via a fuel conduit 107. In some examples, the fuel conduit may be coupled (e.g., fluidly coupled) with a common fuel rail and a plurality of fuel injectors. In one example, the engine may be a multi-fuel engine and may combust one or more fuel types delivered thereto. A more detailed example of the multi-fuel engine is discussed in detail below with reference to FIG. 2.

During operation, each cylinder (e.g., combustion chamber) within the engine may use a four stroke cycle. The cycle includes the intake stroke, the compression stroke, the expansion stroke, and the exhaust stroke. During the intake stroke, generally, the exhaust valve closes and the intake valve opens. Air is introduced into the combustion chamber via an intake manifold, and a piston moves to a bottom of the cylinder so as to increase a volume within the combustion chamber. A position at which the piston is near the bottom of the cylinder and at an end of its stroke (e.g., when the combustion chamber is at its largest volume) may be referred to as "bottom dead center" (BDC). During the compression stroke, the intake valve and the exhaust valve are closed. The piston moves toward a cylinder head of the cylinder so as to compress the air within the combustion chamber. A position at which piston is at the end of its stroke and closest to the cylinder head (e.g., when the combustion chamber is at its smallest volume) may be referred to as "top dead center" (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, expanding gases push the piston back to BDC (e.g., from TDC). A crankshaft converts piston movement into a rotational torque of a rotary shaft. Finally, during the exhaust stroke, the exhaust valve opens to release the combusted air-fuel mixture to an exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, e.g., to increase an efficiency of the aftertreatment system. In some examples, a two-stroke cycle may be used rather than a four-stroke cycle.

The engine may receive intake air for combustion from an intake passage 114. The intake air includes ambient air from outside of the vehicle flowing into the intake passage through an air filter 160. The intake passage may include and/or be coupled to the intake manifold of the engine. Exhaust gas resulting from combustion in the engine is supplied to an exhaust passage 116 via an exhaust port. The exhaust gas flows through the exhaust passage, to a muffler 118, and out of an exhaust stack 119 of the vehicle.

In one example, the vehicle is a diesel-electric vehicle, where the engine may be coupled to an electric power generation system, including an alternator/generator 122 and electric traction motors 124. The alternator/generator may additionally include a direct current (DC) generator. In other examples, the engine may be a diesel engine, a gasoline engine, a biodiesel engine, an alcohol or hydrogen engine, a natural gas engine (spark or compression ignition), or a combination of two or more of the foregoing that generates a torque output during operation. The torque output may be transmitted to the electric generator or alternator through a mechanical coupling from the engine. In one example, and as depicted in FIG. 1, six pairs of traction motors correspond to each of six pairs of motive wheels of the vehicle. In another example, the alternator/generator may be coupled to one or more resistive grids 126 or an energy storage device (e.g., a battery). The resistive grids may dissipate excess engine torque and/or electricity generated by traction motors in dynamic braking mode via heat produced by the grids from generated electricity. The energy storage device may be used to capture dynamic braking energy, or energy from the generator directly, or from any one of a number of selectively couplable sources of electricity (and conversely may pay out energy as may be useful or commanded).

The alternator/generator produces electrical power that may be stored (such as, in a battery) and/or applied for subsequent propagation to a variety of downstream electrical components. In one example, the alternator/generator may be coupled to an electrical system, which may include one or more electrical loads configured to run on electricity generated by the alternator/generator, such as vehicle headlights, a cabin ventilation system, and an entertainment system, and may further include an energy storage device (e.g., a battery) which may be charged by electricity generated by the alternator/generator.

The vehicle system may include a turbocharger 120 that may be arranged between the intake passage and the exhaust passage. The turbocharger increases air charge of ambient air drawn into the intake passage to provide greater charge density during combustion to increase power output and/or engine-operating efficiency. The turbocharger may include a compressor 121 (disposed in the intake passage) which may be at least partially driven by a turbine 123 (disposed in the exhaust passage). The turbine may be a fixed geometry turbine, or the turbine may be a variable geometry turbine, where a variable vane control adjusts a position of variable geometry turbine vanes. In the case of the variable geometry turbine, exhaust gases may pass through the turbine supplying little energy to rotate the turbine when vanes are in an open position, while exhaust gases may pass through the turbine and impart increased force on the turbine when the vanes are in a closed position. As the turbine rotates, heat and kinetic energy in the exhaust gases may be converted into mechanical energy, which may be used to drive the compressor of the turbocharger to deliver compressed air to the engine intake (e.g., to provide a pressure boost to cylinders of the engine based on engine operating conditions). While a single turbocharger is included in FIG. 1, the system may include multiple turbine and/or compressor stages or multiple turbochargers. The turbine may include a turbine speed sensor 180 to measure a turbine speed, and a turbine inlet temperature sensor 125 may be positioned in the exhaust passage, upstream of an inlet of the turbine, to measure a temperature thereat.

In another embodiment, the turbocharger may be an e-turbo, where an electrical machine 190 mechanically coupled to the turbine may convert the mechanical energy into electrical energy. The e-turbo may be integrated into a shaft of the turbocharger, where the compressor and the turbine are mechanically linked. The e-turbo may be operated as a motor/generator that can be used to motor the shaft (e.g., speed it up) to increase a work output of the compressor or slow the shaft down to extract excess energy. While operating in a generating mode, extracting the excess exhaust energy may result in improved overall engine efficiency. While operating in a motoring mode, the compressor may provide additional airflow to the engine, which may improve a combustion and/or an emissions of the vehicle. Additionally, the electrical energy may be used to power one or more accessory devices of the vehicle, such as an electric motor, and/or stored in an energy storage device 196 (e.g., a battery, capacitor bank, or electro-chemical converter). In one example, the electric motor powers one or more wheels of the vehicle.

The vehicle system may include a compressor bypass passage 140 coupled directly to the intake passage, upstream of the compressor and upstream of the engine. In one example, the compressor bypass passage may be coupled to the intake passage, upstream of the intake manifold of the engine. The compressor bypass passage may divert airflow from downstream the compressor to atmosphere.

Additionally, a wastegate 127 may be disposed in a bypass passage around the turbine, which may be adjusted, via actuation from the controller, to increase or decrease exhaust gas flow through the turbine. For example, opening the wastegate (or increasing an amount of opening) may decrease exhaust gas flow through the turbine and correspondingly decrease a rotational speed of the compressor. As a result, less air may enter the engine, thereby decreasing the combustion air-fuel ratio (AFR).

The vehicle system may further include a cooling system 150 (e.g., an engine cooling system). The cooling system may circulate coolant through the engine to absorb waste engine heat to distribute to a heat exchanger, such as a radiator 152 (e.g., a radiator heat exchanger). In one example, the coolant may be water, anti-freeze, or a mixture of the two. In another example, the coolant may be oil. A fan 154 may further be coupled to the radiator to maintain an airflow through the radiator when the vehicle is moving slowly or stopped while the engine is running. In some examples, a fan speed may be controlled by the controller. Coolant that is cooled by the radiator may enter a tank (not shown in FIG. 1). The coolant may then be pumped by a pump 156 back to the engine or to another component of the vehicle system.

The vehicle system may include an aftertreatment system 117. In one embodiment, the aftertreatment system may be coupled in the exhaust passage downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems. In one example, an aftertreatment temperature sensor 115 is arranged at or upstream of an inlet of the aftertreatment system, which may measure a temperature of exhaust gas prior to entering the aftertreatment system. Additionally, one or more AFR sensors or oxygen ($O_2$) sensors may be arranged on an exhaust conduit upstream and/or downstream of the aftertreatment system. For example, an AFR sensor or $O_2$ sensor 181 may be arranged at the inlet of the aftertreatment system, which may estimate an AFR of the engine from the exhaust gas prior to entering the aftertreatment system, or an AFR sensor or $O_2$ sensor 182 may be arranged downstream of the aftertreatment system (e.g., at an exhaust pipe), which may estimate the AFR from exhaust gas exiting the aftertreatment system. Additionally or alternatively, NOx and/or ammonia sensors (not shown at FIG. 1) may be arranged downstream of the aftertreatment system to sense an amount of NOx and/or ammonia slip therethrough.

Catalysts are shown to exhibit a maximum (e.g., peak) NOx conversion at a particular exhaust gas temperature. As such, for minimizing vehicle emissions, it may be desirable to maintain temperatures within a range of temperatures near a peak conversion of the catalyst(s) used in the aftertreatment system. For example, no oxidation or conversion may occur at low exhaust gas temperatures (e.g., below approximately 120° C.). As a temperature of a catalyst in the aftertreatment system increases, oxidation or conversion rates may increase. As the catalyst temperature is raised above a threshold temperature (e.g., 150° C.), conversion rates may increase steeply with increasing temperature to maximum conversion rates [e.g., 90% for carbon monoxide (CO) and 70% for hydrocarbon (HC)]. At high temperatures (e.g., 250° C.-350° C.), catalyst performance stabilizes to form a characteristic plateau on a light-off curve of the catalyst. As such, at least for minimizing vehicle emissions, it may be desirable to maintain the exhaust gas temperature above the plateau temperature and within a range in which a corresponding aftertreatment system exhibits near maximum conversion efficiency.

The vehicle system may include a low-pressure EGR system 185 coupled to the engine. The low-pressure EGR system may route the exhaust gas from the exhaust passage of the engine to the intake passage downstream of the turbocharger. In some embodiments, the EGR system may be coupled exclusively to a group of one or more donor cylinders of the engine (also referred to as a donor cylinder system). The vehicle system may further include a high-pressure EGR system 183 coupled to the exhaust passage upstream of the turbine and downstream of the compressor. A pressure of high-pressure EGR is greater than a pressure of low-pressure EGR.

The controller may control various components and operations related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation. In some examples, the controller may include more than one controller each in communication with one another, such as a first controller to control the engine and a second controller to control other operating parameters of the vehicle (such as engine load, engine speed, brake torque, etc.). In one example, the first controller may control various actuators based on output received from the second controller and/or the second controller may control various actuators based on output received from the first controller.

The controller may receive information from a plurality of sensors and may send control signals to a plurality of actuators. For example, the controller, while overseeing control and management of the vehicle, may receive signals from a variety of engine sensors. The signals may be used to determine operating parameters and operating conditions, and correspondingly adjust various engine actuators to control operation of the vehicle. For example, the engine controller may receive signals from various engine sensors including, but not limited to, engine speed, engine load (e.g., derived from fueling quantity commanded by the engine controller, fueling quantity indicated by measured fuel system parameters, averaged mean-torque data, manifold pressure, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the turbine inlet temperature sensor, or the exhaust temperature entering the aftertreatment system, as determined from the aftertreatment temperature sensor), particulate filter temperature, particulate filter back pressure, engine coolant pressure, exhaust oxides-of-nitrogen quantity (e.g., from the NOx sensor), exhaust soot quantity (e.g., from a soot/particulate matter sensor), exhaust gas oxygen level, or the like. Correspondingly, the controller may control the vehicle by sending commands to various components such as the traction motors, the alternator/generator, cylinder valves, fuel injectors, a throttle, the compressor bypass valve (or an engine bypass valve in alternate embodiments), the wastegate, or the like. Other actively operating and controlling actuators may be coupled to various locations in the vehicle.

The controller may monitor an engine throttle setting. Such monitoring may be performed for an engine governor. For example, the engine governor may react to the engine throttle setting to adjust engine operation. In one embodiment, the throttle setting may be continuously adjustable. In one embodiment, an operator of the vehicle may adjust an input device between a plurality of determined engine throttle settings. Based on a selected engine throttle setting, the controller may adjust engine operation to provide desired engine performance (e.g., such as a desired vehicle speed). As an example, the plurality of engine throttle settings may be used. Predetermined throttle settings may be referred to as notch settings. Suitable notch settings may include a notch 0, a notch 1, a notch 2, a notch 3, a notch 4, a notch 5, a notch 6, a notch 7, and a notch 8. An increase in a numerical value of the engine notch setting may correspond (directly or indirectly) with an increase in vehicle speed and/or engine power output. Adjusting the engine notch setting may further make adjustments to fuel injection timing and fuel rail pressure. Notch 0 may be an idle setting. For example, notch 0 may correspond to not moving the locomotive, notch 4 may provide a mid-level of speed, and notch 8 may be a maximum speed setting. For example, the controller may adjust engine revolutions per minute (RPM), gearing, valve timings, and other parameters to move the vehicle at a speed corresponding to the selected engine throttle setting. In one example, the throttle may refer to any device used to control or limit the power or speed of the engine. For example, the engine may be adjusted to generate more power to increase the vehicle speed, or to accommodate a heavy load (e.g., due to cargo and/or grade) at a lower vehicle speed.

Figure 2:
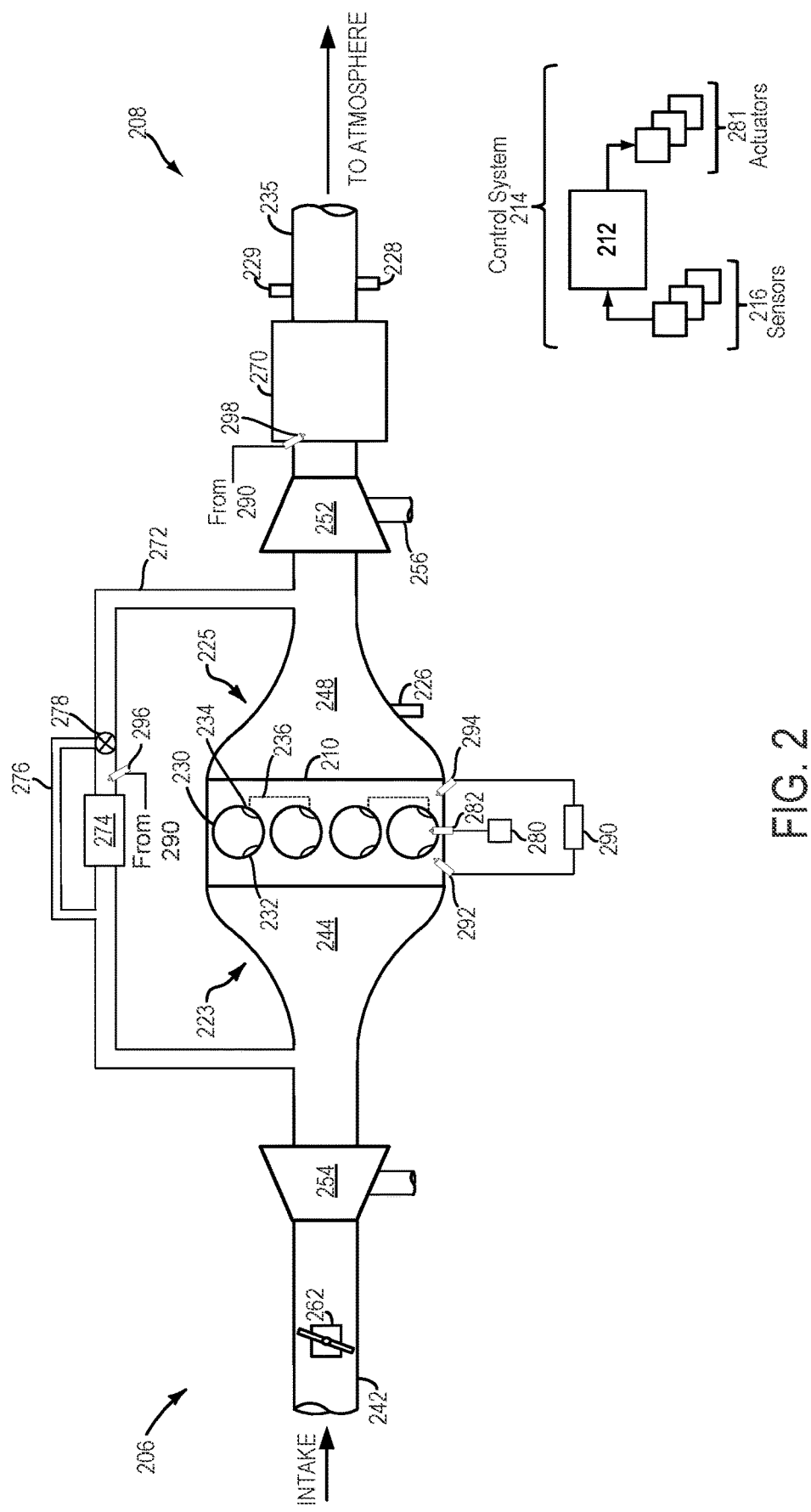
FIG. 2 shows a detailed view of an engine system.
Figure 3:
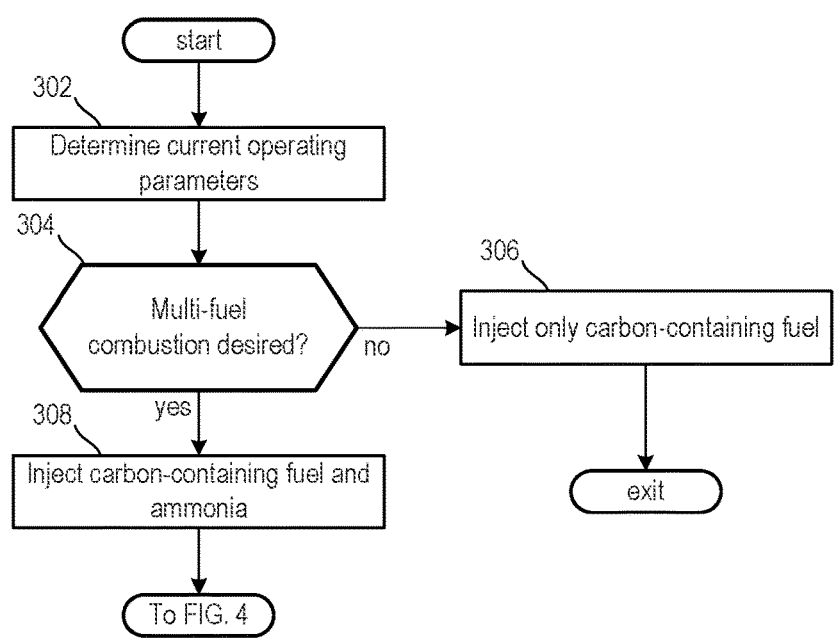
FIG. 3 shows a method for determining if multi-fuel combustion in the engine is desired.
Figure 4:
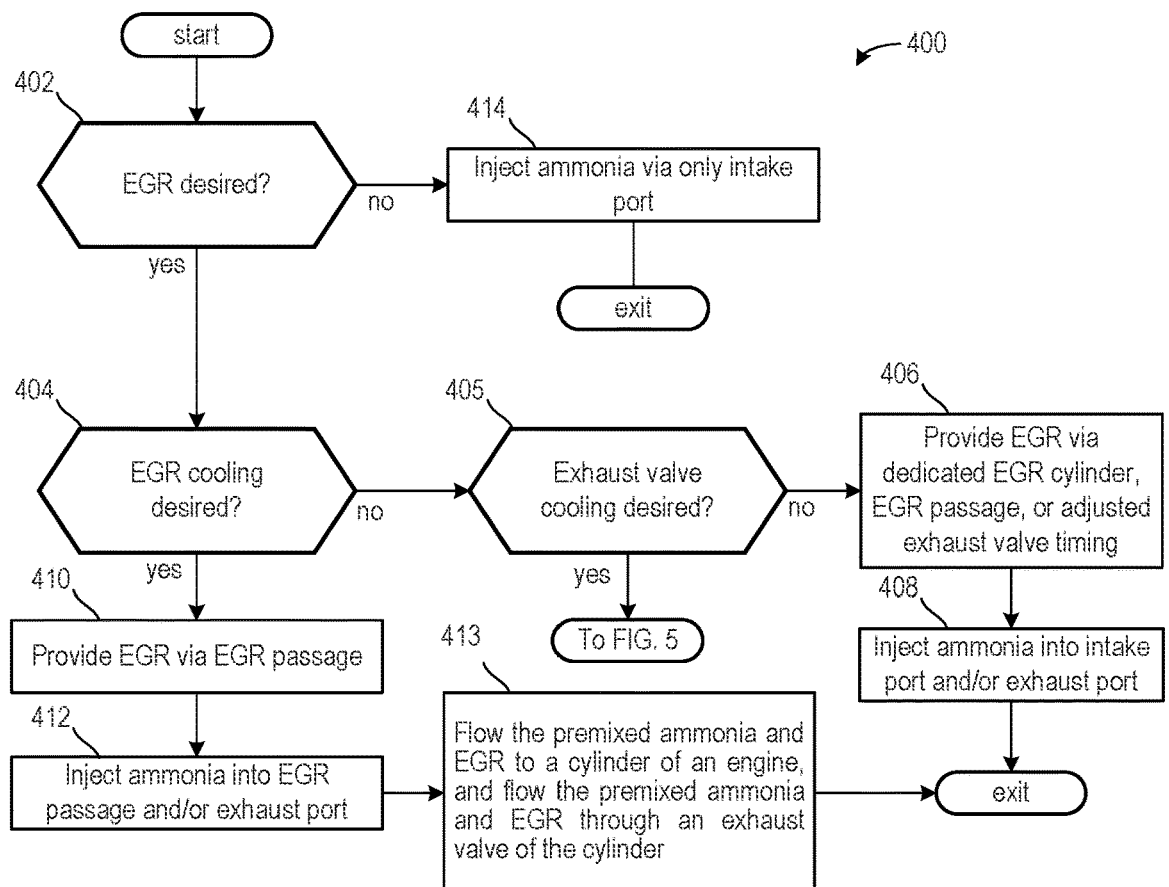
FIG. 4 shows a method for determining if exhaust gas recirculation is desired during multi-fuel operation of the engine.
Figure 5:
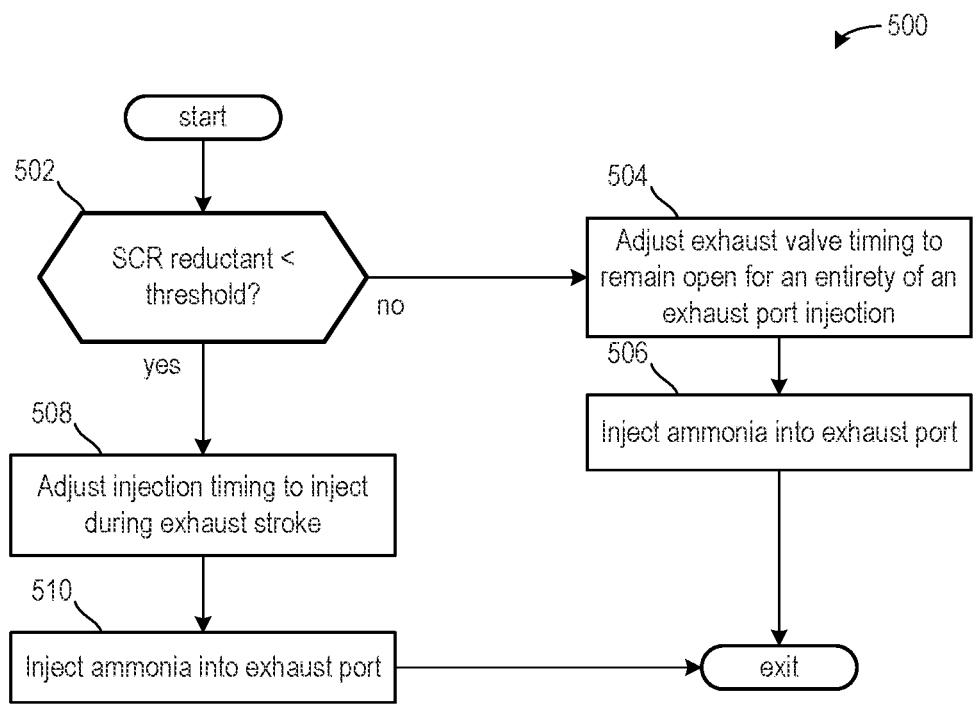
FIG. 5 shows a method for determining a selective catalytic reduction reductant load during multi-fuel operation of the engine.
Figure 6:
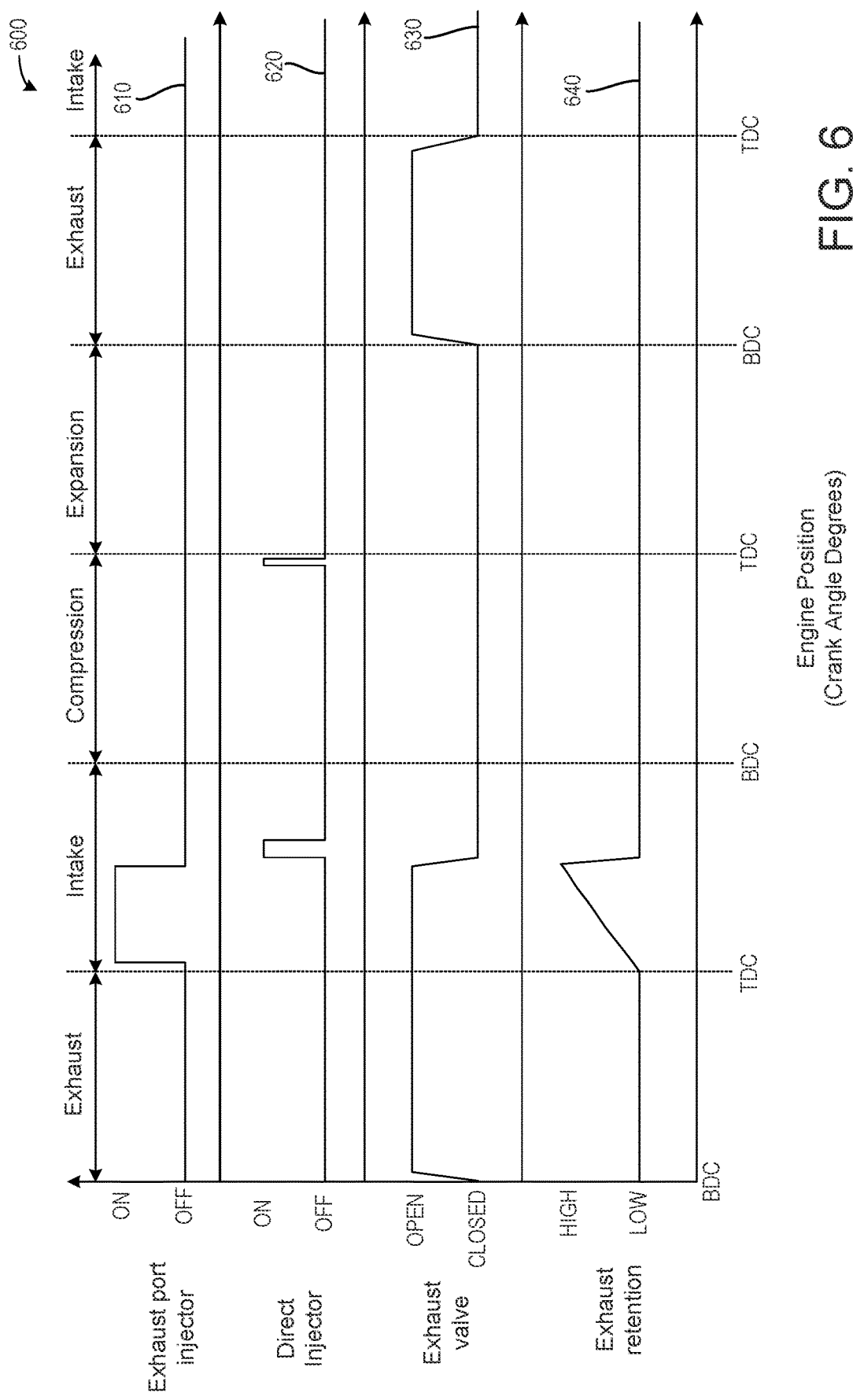
FIG. 6 shows a timeline illustrating adjustments to diesel injection timing during multi-fuel operation of the engine.

A more detailed view of the engine, injectors of the fuel system, and the aftertreatment system is shown in FIG. 2. A controller of the vehicle system may use a plurality of different control strategies to adjust exhaust valve timing, diesel injection timing, and ammonia injection location based on substitution rates, engine temperatures, and exhaust temperatures, as shown in the methods of FIGS. 3-5. An exemplary timing of operations of the methods of FIGS. 3-5 is shown in FIG. 6.

FIG. 2 shows a schematic depiction of a vehicle system 206 that may be a non-limiting example of vehicle 106 of FIG. 1. The vehicle system may be a hybrid that can derive propulsion power from engine system 208 and/or an on-board energy storage device. An energy conversion device, such as a generator, may be operated to absorb energy from vehicle motion and/or engine operation, and then convert the absorbed energy to an energy form suitable for storage by the energy storage device.

A suitable engine system may include an engine 210 having a plurality of cylinders 230, which may include, for example, the cylinder 101 of FIG. 1. Each cylinder may include an intake valve 232 and an exhaust valve 234. Each cylinder may receive a fuel injection from one or more fuel injectors. For example, each cylinder may include a direct fuel injector 282 coupled to a first fuel tank 280. The engine may be a multi-fuel engine configured to combust multiple types of fuels separately or in combination. In one example, injections of the various fuels may occur at different locations of the engine system. For example, the engine may optionally include one or more of an intake port injector 292 and an exhaust port injector 294 coupled to a second fuel tank 290. The first fuel tank may house a first fuel and the second fuel tank may house a second fuel. The first fuel may include a carbon-containing fuel and the second fuel may supply a carbon-free fuel. In one example, the carbon-containing fuel may include one of gasoline, diesel, bio-diesel, natural gas, HDRD, and alcohol. The carbon-free fuel may include one or more of ammonia and hydrogen. In some examples, the engine may be a spark-free engine. In other examples, the engine may be a spark-ignited engine. Additionally or alternatively, the second fuel may include a fuel with a lower carbon content than the first fuel.

The intake port injector may be positioned to inject ammonia (e.g., the carbon-free fuel) into an intake port of the engine. The exhaust port injector may be positioned to inject ammonia into an exhaust port of the engine. In one example, the ammonia injection from the exhaust port injector may contact and accumulate onto the exhaust valve, which may provide a cooling effect thereto. In some examples, the exhaust valve timing and/or injection timing may adjust an amount of contact between the exhaust valve and the ammonia injection. In one example, when a multi-fuel combustion is desired, an amount of ammonia injected via the exhaust port injector may be proportional to a desired exhaust valve cooling. For example, the amount of ammonia injected may increase in response to the desired exhaust valve cooling level increasing. In some examples, additionally or alternatively, the substitution rate may increase in response to the desired exhaust valve cooling increasing.

The engine includes an engine intake 223 and an engine exhaust 225. The engine intake includes an air intake throttle 262 fluidly coupled to an engine intake manifold 244 via an intake passage 242. The engine exhaust includes an exhaust manifold 248 leading to an exhaust passage 235 that routes exhaust gas to the atmosphere. Optionally, one or more of the cylinders may be interconnected such that exhaust gases from one cylinder may flow to another cylinder. In one example, passages 236 may connect two or more cylinders such that exhaust gases of a first cylinder may be routed to a second cylinder without entering the exhaust manifold or the exhaust passage. In one example, the first cylinder is a donor cylinder configured to supply EGR internally.

Engine exhaust may include one or more emission control devices 270 mounted in a close-coupled position or in a far underbody position. The one or more emission control devices may include a three-way catalyst, lean NOx trap, diesel particulate filter, oxidation catalyst, SCR device, etc. In one example, a catalyst injector 298 may be positioned upstream of the one or more emission control devices. In one example, the one or more emission control devices include at least the SCR device (or a plurality of SCR devices), wherein the catalyst injector may replenish an amount of reductant therein. The catalyst injector may be coupled to the second fuel tank when the second fuel is ammonia. If the second fuel system is an ammonia fuel system, then a urea system for reducing the SCR device may be omitted and ammonia injected by the catalyst injector 298 may reduce the SCR device. This may decrease packaging constraints and manufacturing costs.

An EGR passage 272 may branch from the exhaust passage at a junction (e.g., an intersection) upstream of a turbine 252. The EGR passage may house an optional EGR cooler 274 and a cooler bypass 276. An EGR valve 278 may control an amount of EGR flow to the intake passage downstream of a compressor 254. The turbine may be mechanically coupled to the compressor via a shaft 256, similar to the turbocharger of FIG. 1. Thus, in the example of FIG. 2, the EGR passage is a high-pressure (HP) EGR passage configured to direct exhaust gases from upstream of the turbine to a portion of the intake downstream of the compressor. The EGR passage may further include an EGR passage injector 296 coupled to the second fuel tank. In one example, the EGR passage injector may be arranged upstream of an EGR cooler inlet and downstream of the cooler bypass relative to a direction of exhaust gas flow. In another example, additionally or alternatively, the EGR passage injector may be arranged within a threshold distance from which the EGR passage branches from the exhaust passage, upstream of the cooler bypass. The threshold distance may be equal to a non-zero, positive value and may be based on a temperature decay or thermal degradation of exhaust gas through the EGR passage. For example, the EGR passage injector may be positioned near or adjacent to the junction between the exhaust passage and the EGR passage where exhaust gas temperature decay is lowest or lower than a threshold decay. The EGR passage injector may be positioned to inject in a direction acutely angled or parallel to exhaust gas flow in the EGR passage. The EGR passage injector may provide some amount of EGR cooling such that an EGR cooler usage may be reduced, thereby increasing a longevity of the EGR cooler. In some examples, the EGR cooler bypass may be omitted.

In some examples, the EGR passage may be configured without the EGR cooler. In such examples, EGR cooling may be provided via only the EGR passage injector. For example, when EGR cooling is desired, the EGR passage injector may be activated, wherein an amount of ammonia injected therewith may be based on a desired EGR cooling. Additionally or alternatively, the amount of ammonia injected may be based on a currently allowed substitution rate and/or a reductant load of the SCR device. As an example, if the amount of ammonia demanded for EGR cooling is greater than an amount allowed based on the currently allowed substitution rate, then an EGR flow rate may be reduced such that the amount of ammonia permissible based on the currently allowed substitution rate is sufficient to cool the EGR.

In some examples, additionally or alternatively, the EGR and the ammonia may be premixed via injecting the ammonia into the EGR passage. The amount injected may be set based on the desired EGR cooling. If the amount injected is greater than the current substitution rate, then the premixed EGR and ammonia may flow to a storage device to be consumed during future driving conditions.

In some examples, additionally or alternatively, ammonia may be used as coolant within the EGR cooler. For example, ammonia from the second fuel tank may flow to the EGR cooler, wherein EGR flowing therethrough may be cooled and the ammonia may be heated. The heated ammonia may be returned to the second fuel tank or sent to a fuel rail coupled to one or more of the intake port injector, the exhaust port injector, and the EGR passage injector. The heated ammonia may vaporize more efficiently upon being injected relative to cooler ammonia.

In some examples, additionally or alternatively, one or more NOx sensors may be spaced about the SCR device. For example, a first NOx sensor may be arranged upstream of the SCR device and downstream of the EGR passage relative to a direction of exhaust gas flow. A second NOx sensor may be arranged downstream of the SCR device. The NOx sensors may detect an amount of NOx and ammonia in the exhaust gas, wherein the second NOx sensor may sense a NOx/ammonia slip through the SCR device. In some examples, the substitution rate, an ammonia injection amount via the exhaust port injector and the EGR passage injector, and an ammonia injection amount via the catalyst injector may be based on NOx/ammonia slip through the SCR device. For example, as slip increases, then the substitution rate may decrease. As slip decreases or is no longer present, then the substitution rate may increase.

The vehicle system may further include a control system 214. The control system is shown receiving information from a plurality of sensors 216 (various examples of which are described herein) and sending control signals to a plurality of actuators 281 (various examples of which are described herein). As one example, the sensors may include an exhaust gas sensor 226 located upstream of the emission control device, a temperature sensor 228, and a pressure sensor 229. Other sensors such as additional pressure, temperature, AFR, and composition sensors may be coupled to various locations in the vehicle system. As another example, the actuators may include the air intake throttle.

A controller 212 may be configured as a conventional microcomputer including a microprocessor unit, input/output ports, read-only memory, random access memory, keep alive memory, a controller area network (CAN) bus, etc. In one example, the controller may be configured as a powertrain control module (PCM). The controller may be shifted between sleep and wake-up modes for additional energy efficiency. The controller may receive input data from the various sensors, process the input data, and trigger the various actuators in response to the processed input data based on instruction or code programmed therein corresponding to one or more routines.

Thus, an engine system may include a multi-fuel engine configured to combust one or more fuels. A first fuel system may provide a first fuel via direct injectors to cylinders of the engine. A second fuel system may provide a second fuel via a variety of injectors including intake port injectors, exhaust port injectors, and the EGR passage injector. A controller with instructions stored thereon may command adjustment of amounts of the second fuel injected by one or more of the injectors of the second fuel system based on one or more operating conditions described with respect to the methods below. During some operating modes, one or more of the injectors of the second fuel system may be used, wherein the controller may balance amounts of second fuel injected via the exhaust port injector, the EGR passage injector, and the intake passage injector. In one example, injections through the exhaust port injectors and the EGR passage injector may be prioritized over the intake passage injector. Prioritizing the exhaust port injectors and the EGR passage injector may include injecting a highest desired amount of second fuel via one or more of the EGR passage injector and the exhaust port injectors prior to injecting second fuel via the intake port injector.

The engine system may further include multiple methods of providing EGR. Herein, EGR is defined as an exhaust gas expelled from a cylinder and returned to the engine for combustion. As will be described in greater detail below, EGR may be provided via a dedicated donor cylinder, an adjusted exhaust valve timing, and/or the EGR passage. The donor cylinder may expel exhaust gases from its interior volume and flow the exhaust gases to another cylinder fluidly coupled thereto. The adjusted exhaust valve timing may include where an exhaust valve opening may overlap with an intake valve opening, resulting in a vacuum of the cylinder sucking expelled exhaust gases back into the cylinder. In this way, the EGR rate may be set via the donor cylinder(s), the adjusted exhaust valve timing, and valve position in the EGR passage.

Turning now to FIG. 3, a high-level flowchart shows a method 300 for determining if multi-fuel combustion is desired. The method may be executed by a processor of a controller of a vehicle, such as the controller of the vehicle of FIG. 1 or 2, based on instructions stored in a memory of the controller.

The method may begin at step 302, where the method may include estimating and/or measuring vehicle operating parameters and/or conditions. Vehicle operating parameters and/or conditions may be estimated based on one or more outputs of various sensors of the vehicle (e.g., such as one or more exhaust temperature sensors, an engine speed, a wheel speed, and/or a turbo shaft speed sensor, a torque sensor, a pressure sensor, etc., as described above in reference to the vehicle system of FIG. 1). Vehicle operating conditions may include engine velocity and engine load, vehicle velocity, transmission oil temperature, exhaust gas flow rate, mass air flow rate, coolant temperature, coolant flow rate, engine oil pressures (e.g., oil gallery pressures), operating modes of one or more intake valves and/or one or more exhaust valves, electric motor velocity, battery charge, engine torque output, vehicle wheel torque, and the like.

At step 304, the method may include determining if multi-fuel combustion is desired. Multi-fuel combustion may include combustion of at least a primary fuel and a secondary fuel. In one example, the primary fuel may be a carbon-containing fuel and the secondary fuel may be a carbon-free fuel including fewer carbons per molecule than the carbon-containing fuel. Multi-fuel combustion may decrease carbon emissions of the vehicle by increasing an amount of the secondary fuel and decreasing an amount of the primary fuel. In one example, the multi-fuel combustion may include diesel as the primary fuel and ammonia as the secondary fuel. Conditions that may impact a desired substitution rate may include engine airflow, engine load, intake manifold temperature, ambient pressure and ambient temperature, exhaust manifold pressure, and the like. The desired substitution rate may be defined as a percentage of total fuel energy provided by the secondary fuel. For example, if the desired substitution rate is 60%, then ammonia may provide 60% of the fuel energy and diesel may provide 40% of the fuel energy. In one example, an amount of carbon-free fuel increases as the substitution rate increases.

Additionally or alternatively, in some examples, the desired substitution rate may be adjusted in response to carbon emissions and/or NOx emissions. For example, as carbon emissions increase, then it may be desired to increase the substitution rate. Alternatively, as combustion efficiency decreases, it may be desired to decrease the substitution rate. Additionally or alternatively, a vehicle controller may select whether multi-fuel combustion is desired. For example, certain locations may not include fuel stations including alternative fuels such as HDRD, ammonia, hydrogen, and the like. The vehicle controller may request combustion of a single fuel, e.g., if other sources of fuel are not available at local fuel stations. The vehicle controller may be onboard or offboard the vehicle, depending on the selected configuration. In one embodiment, the vehicle controller is an operator that is located onboard the vehicle during operation.

If multi-fuel combustion is not desired, then at step 306, the method may include injecting only the carbon-containing fuel. The controller may signal to the direct injector of the engine to inject the carbon-containing fuel. The controller may further signal to deactivate the intake port injector, the exhaust port injector, and the EGR passage injector.

If multi-fuel combustion is desired, then at step 308, the method may include injecting the carbon-containing fuel and the ammonia. In one example, the carbon-containing fuel may be injected via only the direct injector. Ammonia may be injected and delivered to the engine via one or more of the intake port injector, the exhaust port injector, and the EGR passage injector. As described with respect to FIG. 4, it may be desired to expose ammonia to increased temperatures to promote vaporization. It may be desirable to do so without increasing an engine temperature above an upper threshold temperature. A location of injection of the ammonia may be selected, or adjusted, based on various engine operating conditions. The method 300 of FIG. 3 may continue to the method 400 of FIG. 4.

Turning now to FIG. 4, a high-level flow chart shows an example of the method 400 for adjusting a location at which ammonia is provided when multi-fuel combustion is desired. The method may adjust the location at which ammonia is provided based on EGR conditions.

At step 402, the method may include determining if EGR is desired. EGR may be desired when an engine temperature is greater than a threshold temperature. In one example, the threshold temperature is equal to a temperature greater than a desired engine temperature operating range. In this way, EGR may decrease the engine temperature. Additionally or alternatively, EGR may be desired in response to an amount of engine NOx production. For example, if the amount of engine NOx production is greater than a threshold NOx output, then EGR may be desired to decrease the amount of engine NOx production.

If EGR is desired, then at step 404, the method may include determining if EGR cooling is desired. EGR cooling may be desired if the engine temperature is greater than the threshold temperature. Additionally or alternatively, EGR cooling may be desired if a greater amount of charge air is desired. For example, uncooled EGR may heat the intake air, which may decrease the intake charge density and thereby allow a lesser amount of charge air mixture to enter the combustion chamber.

If EGR cooling is not desired, then at step 405, the method may include determining if exhaust valve cooling is desired. Exhaust valve cooling may be desired if an exhaust valve temperature is greater than or equal to a threshold exhaust valve temperature. In one example, the exhaust valve temperature may be estimated based on a cylinder head temperature, wherein the cylinder head temperature may be determined based on an estimated coolant temperature, an engine operating condition, indirect measurements of other parameters, or a coolant temperature directly measured via a temperature sensor. If exhaust valve cooling is desired, then the method 400 of FIG. 4 may proceed to a method 500 as shown in FIG. 5.

If exhaust valve cooling is not desired, then at step 406, the method may include providing EGR via a donor cylinder (e.g., a dedicated EGR cylinder) or the EGR passage, or adjusting an exhaust valve timing. The engine may include a plurality of internal EGR passages configured to flow exhaust gases from a first cylinder to a second cylinder. In this way, a portion of EGR may be provided via a donor cylinder fluidly coupled to a non-donor cylinder via internal EGR passages. The plurality of internal EGR passages may couple only directly adjacent cylinders in one example. In other examples, one or more cylinders of a plurality of cylinders may function as dedicated EGR cylinders during some engine conditions, such as when multi-fuel combustion is desired. During these conditions, the dedicated EGR cylinders may expel exhaust gases to at least one of the plurality of internal EGR passages or to a reservoir, from which exhaust gases may be distributed to other cylinders. Additionally or alternatively, exhaust gases may be provided through the EGR passage by opening an EGR valve in the EGR passage. The opening of the EGR valve may be based on other EGR sources (e.g., donor cylinders, exhaust gas re-ingestion, and exhaust gas retention) to meet a desired EGR flow rate.

When cooling is not desired, exhaust gases flowing through the EGR passage may bypass the EGR cooler via a cooler bypass. As such, the EGR valve may be actuated to a position that flows exhaust gases to the cooler bypass and blocks exhaust gases from flowing to the EGR cooler. Exhaust gases in the cooler bypass may reenter the EGR passage at a location downstream of the EGR cooler.

Additionally or alternatively, an exhaust valve timing of the cylinders may be adjusted. In one example, the exhaust valve timing may be adjusted for a given cylinder such that a closing time of an exhaust valve during an exhaust stroke is advanced. Exhaust gases in the cylinder may be retained based on the advancing of the closing time. For example, as the advancing increases, more exhaust gases may be retained, thereby effectively increasing an EGR rate.

In some examples, additionally or alternatively, the exhaust valve timing may be delayed such that the exhaust valve may be open with an intake valve of the cylinder during an intake stroke. By delaying the timing of exhaust valve closure, exhaust gases may be re-ingested into the cylinder. In one example, as the exhaust valve closure is more delayed, an amount of exhaust gas re-ingested into the cylinder increases, thereby increasing the EGR rate.

At step 408, the method includes injecting ammonia into only the intake port. In one example, ammonia is not injected into the EGR passage since EGR cooling is not desired. As such, the EGR passage injector may be deactivated and a cooling effect provided by an ammonia injection does not occur. Additionally or alternatively, ammonia may not be injected into the exhaust port via the exhaust port injector due to exhaust valve cooling not being desired.

In some examples, additionally or alternatively, an amount of ammonia injected into the EGR passage via the EGR passage injector may be controlled to a lower amount when EGR cooling is not desired compared to when EGR cooling is desired. For example, the amount of ammonia may be based on a temperature difference between a current EGR temperature and a lowest desired EGR temperature, the lowest desired EGR temperature based on the threshold engine temperature. In some examples, if injections via the EGR passage injector are desired when EGR cooling is not, then boost and other engine conditions may be adjusted to increase intake temperatures and compensate for cooling provided by the ammonia injected. In further examples, one or more cylinders may be deactivated. A temperature of the (remaining) activated cylinders may increase as a load thereof is increased to compensate for the deactivated cylinders. By doing this, ingestion of a lower temperature EGR may be tolerated due to the increased cylinder temperature. By injecting ammonia into the EGR passage, an amount of time during which the ammonia may vaporize is increased relative to the intake port injection. As such, combustion conditions may be adjusted for improved combustion.

Returning to step 404, if EGR cooling is desired, then at step 410, the method may include flowing EGR via the EGR passage. Additionally, exhaust valve timing routines configured to increase exhaust gas re-ingestion may be executed in combination with flowing EGR through the EGR passage (as discussed above at step 406).

At step 412, the method may include injecting ammonia into the EGR passage and/or the exhaust port. Injecting ammonia into the EGR passage may include signaling the EGR passage injector to inject ammonia. An amount of ammonia injected by the EGR passage injector may be based on one or more of a substitution rate and a desired EGR cooling. For example, as the substitution rate increases and/or the desired EGR cooling increases, the amount of ammonia injected by the EGR passage injector may increase. In one example, if the substitution rate is relatively high and the desired EGR cooling is relatively low such that the amount of ammonia demanded for combustion is greater than an amount needed to meet the desired EGR cooling, then the EGR passage injector may inject an amount of ammonia demanded for the EGR cooling and a remainder of the ammonia may be injected through the intake port injector. If the desired EGR cooling is relatively high and the substitution rate is relatively low such that the amount of ammonia demanded to cool the EGR is greater than the amount corresponding to the substitution rate, then the amount of ammonia injected via the EGR passage injector may be based on the substitution rate and the EGR valve may be adjusted to flow at least a portion of EGR through the cooler. As such, a desired EGR temperature may be met by mixing cooler cooled EGR and EGR bypassed around the cooler.

During some conditions, EGR cooling and exhaust valve cooling may be desired simultaneously. EGR flow may be balanced between the EGR passage and the exhaust gas re-ingestion via the adjusted exhaust valve timing to meet a desired EGR rate while providing a desired engine temperature reduction and a desired exhaust valve temperature reduction. In one example, the ammonia may be injected into the exhaust port and the EGR passage. The amount of ammonia injected by the exhaust port injector may be prioritized and set based on a desired exhaust valve cooling. As the desired exhaust valve cooling increases, the amount of ammonia injected by the exhaust port injector may increase. Once the desired exhaust valve cooling is met, then the amount of ammonia injected by the EGR passage injector may be determined based on one or more of the desired EGR cooling and the substitution rate, as described above. If the amount of ammonia injected by the exhaust port injector meets the substitution rate, then the EGR passage injector may be deactivated and EGR cooling may be provided by only the EGR cooler. In examples where the EGR cooler is omitted, then EGR may be provided via only the adjusted exhaust valve timing. In this way, all EGR and exhaust valve cooling may be provided via the exhaust port injector. As described above, the exhaust port injector may be positioned to inject directly onto the exhaust valve, which may provide a cooling effect thereto. As exhaust gases are re-ingested into the cylinder via the delayed exhaust valve timing, the exhaust gases may be cooled via the ammonia on the open exhaust valve. If the amount of ammonia demanded to cool the EGR and the exhaust valve is less than the substitution rate, then the intake port injector may be signaled to inject a remaining amount of ammonia.

Returning to step 402, if EGR is not desired then the method may proceed to step 414, where the method may include injecting ammonia via only the intake port injector. The exhaust port injector and the EGR passage injector may be deactivated, such that premixed ammonia and EGR may not flow to the engine.

Turning now to FIG. 5, it shows the method 500 for adjusting ammonia injections based on an SCR reductant demand. The method may begin at step 502, where the method may include determining if an SCR reductant load is less than a threshold load. In one example, the threshold load is based on an amount of ammonia desired for reducing NOx emissions. The threshold load may be a dynamic value based on a current engine NOx output. As the current engine NOx output increases, the threshold load may also increase since more ammonia is being consumed by an SCR device.

If the SCR reductant load is not less than the threshold load, then at step 504, the method may include adjusting an exhaust valve timing to remain open for an entirety of an exhaust port injection. For example, by delaying the exhaust valve closure such that the exhaust valve opening may overlap with an intake stroke, exhaust gases may be re-ingested to supply at least a portion of a desired EGR. The exhaust port injection may be injected toward the exhaust valve to provide the desired cooling thereto. If the SCR reductant load is greater than or equal to the threshold load, it may not be desired to flow ammonia to the SCR device. In one example, excess ammonia flowing to the SCR device may result in an ammonia slip, which may increase NOx emissions. By maintaining the exhaust valve open through at least an entirety of the exhaust port injection of the ammonia, ammonia flow to the SCR device may be limited. Additionally or alternatively, the ammonia flow or second fuel flow to the exhaust passage may be controlled by adjusting a fuel injection timing, duration, and/or quantity.

At step 506, the method may include injecting ammonia into the exhaust port. The amount of ammonia injected into the exhaust port may be based on one or more of a desired exhaust valve cooling and a substitution rate. In one example, if the amount of ammonia demanded for cooling the exhaust valve is greater than the amount of ammonia demanded for meeting the substitution rate, then ammonia may also be injected into the intake port via the intake port injector. A balance between the amount of ammonia injected into the intake port and the exhaust port may be based on one or more of an engine temperature, an exhaust temperature, an exhaust valve timing, and an exhaust valve temperature. An amount of ammonia injected into the exhaust port may increase as one or more of the exhaust temperature increases, the exhaust valve timing becomes more delayed, and the exhaust valve temperature increases. As the amount of ammonia injected into the exhaust port increases, the amount of ammonia injected into the intake port may decrease.

If the SCR reductant load is less than the threshold load at step 502, then at step 508, the method may include adjusting a fuel injection timing to of the exhaust port injector. Adjusting the fuel injection timing may include activating the exhaust port fuel injector during the exhaust stroke. More specifically, the exhaust port fuel injector is activated during a portion of the exhaust stroke in which the exhaust valve is open. For example, the exhaust port fuel injector may be activated prior to TDC of the exhaust stroke and an ammonia injection therefrom may mix with exhaust gases and flow to the SCR device. An amount of ammonia injected during the exhaust stroke may correspond to an SCR ammonia demand and an amount of ammonia injected during an intake stroke may correspond to a desired substitution rate and/or a desired cooling.

At step 510, the method may include injecting ammonia into the exhaust port. The amount of ammonia injected may be based on one or more of the desired exhaust valve cooling, the SCR reductant demand, and the substitution rate. If the amount of ammonia desired for the exhaust valve cooling and the SCR reductant demand is less than the substitution rate, then the intake port injector may be activated to inject a remaining amount of ammonia as described above. If the amount of ammonia desired for the exhaust valve cooling and the SCR reductant demand is greater than the substitution rate, then the exhaust port injection of the ammonia may be equal to the substitution rate in combination with the SCR reductant demand. The exhaust valve timing may be adjusted to open for a portion of the exhaust port injection equal to the substitution rate, thereby allowing a remainder of the exhaust port injection to flow to the SCR device to meet the SCR reductant demand.

Turning now to FIG. 6, it shows a timing diagram 600 illustrating an exhaust valve timing for a multi-fuel engine. Plot 610 illustrates an exhaust port injector activity. Plot 620 illustrates a direct injector activity. Plot 630 illustrates an exhaust valve position. Plot 640 illustrates exhaust gas retention. An engine position is illustrated on the abscissa.

During an initial exhaust stroke, a piston moves from BDC to TDC. The exhaust port injector and the direct injector are off. The exhaust valve is opened in an early stage of the exhaust stroke near BDC. In one example, the early stage of the exhaust stroke may be within 50, 30, or 15 crank angles of BDC. The exhaust gas retention is relatively low (e.g., zero) due to the piston pushing exhaust gases out of the combustion chamber. The exhaust gases expelled may flow to one or more of the EGR passage, the turbine, the aftertreatment device, and the tailpipe.

During a subsequent intake stroke, the exhaust valve remains open. In this way, a closure of the exhaust valve is delayed. A duration of the opening of the exhaust valve may be based on one or more of an exhaust port injector activity and a desired exhaust gas retention. For example, the exhaust valve may be opened later into the exhaust stroke and held open longer into the intake stroke as the desired exhaust gas retention increases. Additionally or alternatively, the exhaust valve may be held open longer due to a longer injection duration of the exhaust port injector as a substitution rate increases.

The exhaust port injector is activated at an early stage of the intake stroke, such as within 50, or 30, or 15 crank angles of TDC. Movement of the piston along with a positioning of the exhaust port injector directs an ammonia injection toward the combustion chamber. The ammonia injection may contact the exhaust valve, which may cool the exhaust valve, prior to flowing into the combustion chamber. Additionally, exhaust gases from a previous combustion event of a cylinder may be drawn into another combustion chamber of a different cylinder during the intake stroke, thereby increasing the exhaust gas retention. In the example of FIG. 6, the exhaust valve is moved to the closed position following a deactivation of the exhaust port injector. The exhaust gas retention is relatively high.

The direct injector is activated and injects diesel fuel or a different fuel, such as any of the fuels described above, following closure of the exhaust valve during the intake stroke. The carbon-containing fuel (e.g., the diesel fuel) may accordingly mix with a (pre)mixture of intake air, EGR, and ammonia, which may increase an ignitability value thereof. In some examples, additionally or alternatively, the direct injector may be activated when the exhaust valve is open. By doing this, the re-ingested exhaust gases premix with the ammonia and flow into the cylinder to further mix with the fuel injected by the direct injector. Thus, in one example, the first fuel, which may be a more combustible fuel, and the second fuel (which may be a relatively less combustible fuel and so may be premixed with EGR and intake air) may then be admixed prior to a compression stroke. Upon mixing of the first fuel and the pre-mixed second fuel, the combined mixture may be a more relatively more combustible mixture than either of the first fuel or the second fuel individually, or even simply combined without the pre-mixing step of the second fuel.

During a compression stroke, the ammonia may vaporize due to higher combustion chamber temperatures achieved via the relatively high exhaust gas retention provided during the intake stroke. The direct injector may be activated again near TDC of the compression stroke, providing an additional source of ignition via the carbon-containing fuel. This may further increase the combustibility of the final/total mixture.

During an expansion stroke, the mixture of ammonia and diesel may be combusted. In examples of spark ignited engines, the first fuel may be gasoline and during the expansion stroke, an ignition device may provide spark to combust the mixture.

During a subsequent exhaust stroke, the exhaust valve may be opened during an early stage of the exhaust stroke, such as within 50, or 30, or 15 crank angles of BDC, and closed during the late stage of the exhaust stroke, such that the exhaust valve opening does not overlap with either the expansion stroke or a subsequent intake stroke. The exhaust valve closure may no longer be delayed due to single fuel combustion being desired, wherein the single fuel may be the carbon-containing fuel in the example of FIG. 6. Single fuel combustion may be desired in response to increased NOx emissions, poor combustion, increased driver demand, ambient conditions, engine operating condition or for other reasons. During single fuel combustion, the substitution rate is reduced to 0% and the exhaust port injector and other ammonia injectors positioned to inject ammonia into a gas stream flowing toward an engine intake are deactivated.

In some examples, additionally or alternatively, the exhaust port and/or intake port inject timings may be adjusted to flow an amount of unburned ammonia to the SCR device. The unburned ammonia may promote reduction of NOx at the SCR device, which may allow higher substitution rates and/or longer periods of multi-fuel combustion. Such higher substitution rates and/or longer periods of multi-fuel combustion may be balanced with a mitigation of ammonia slip through the SCR device since ammonia flow to an ambient atmosphere may be undesired. Flowing unburned ammonia to the SCR device may include activating the exhaust port injector during the exhaust stroke. Flowing unburned ammonia may further include adjusting an injection timing of the injection of the carbon-containing fuel to occur after TDC of the expansion stroke, which may delay combustion and result in incomplete combustion of the ammonia.

Thus, a performance of an engine system of a vehicle may be maximized by adjusting a location at which ammonia is injected as fuel. In one example, the ammonia may be injected into an exhaust port and/or an EGR passage and premixed with hot exhaust gases. The premixed ammonia and exhaust gas may improve a combustibility of the ammonia and provide cooling to the exhaust gas. Specifically, a technical effect of injecting ammonia into the exhaust port and/or the EGR passage is that hot exhaust gases may be utilized to vaporize the ammonia for combustion while the ammonia cools the exhaust gases to reduce an EGR cooler usage. As a result, a system longevity may be increased at least due to a reduced demand for the EGR cooler.

Figure 7:
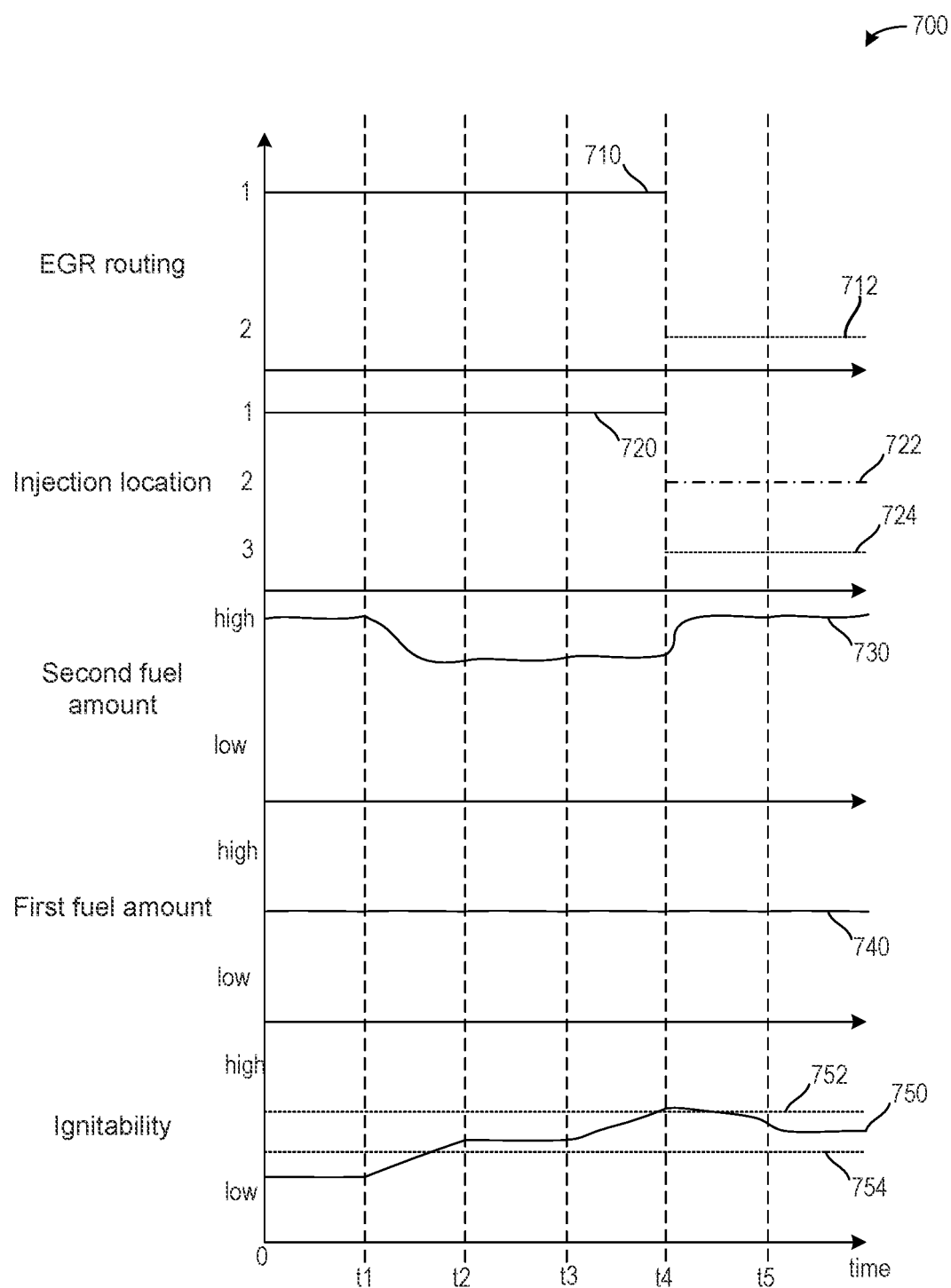
FIG. 7 shows a timeline illustrating adjustments to EGR routing and second fuel injection parameters during multi-fuel operation of the engine.

Turning now to FIG. 7, it shows an operating sequence 700 illustrating changing to operating parameters of an EGR routing and secondary fuel injection parameters during multi-fuel operation of the engine. Plot 710 illustrates if EGR is provided via a first route and plot 712 illustrates if EGR is provided via a second route. Plot 720 illustrates if the second fuel is injected at a first location, plot 722 illustrates if the second fuel is injected at a second location, and plot 724 illustrates if the second fuel is injected at a third location. Plot 730 illustrates an amount of second fuel injected. Plot 740 illustrates an amount of first fuel injected. Plot 750 illustrates an ignitability value of a combustion mixture including the first fuel and the second fuel. Dashed line 752 represents an upper limit of a determined ignitability value range and dashed line 754 represents a lower limit of the determined ignitability value range. The determined ignitability value range may include ignitability values that result in a threshold combustion timing that, in turn, results in combustion timing at or near TDC of the compression stroke. However, the determined ignitability range may include other threshold combustion timings based at least in part on operating parameters. Time increases from a left to a right side of the figure.

Prior to t1, EGR is being routed through a first travel path. In one example, the first travel path includes exhaust gas re-ingestion. As described above, the exhaust valve is maintained open through a portion of a subsequent intake stroke and exhaust gases are re-ingested. The second fuel injection location is at the first location. In the example of FIG. 7, the first location is the exhaust port. The second fuel injected at the exhaust port may mix with re-ingested exhaust gases. The second fuel amount is relatively high. The first fuel amount is between relatively high and relatively low values. In one example, the substitution ratio prior to t1 is relatively high due to the relatively high amount of the second fuel and the first fuel amount being neither relatively high or low. The ignitability value of the combustion mixture is below the lower limit of the determined ignitability value range. In one example, the ignitability value represents a magnitude of ignitability of a combustion mixture, wherein a higher ignitability value is associated with a more ignitable mixture and a lower ignitability value is associated with a less ignitable mixture.

At t1, the second fuel amount is reduced. Between t1 and t2, the EGR routing, the second fuel injection location, and the first fuel amount are maintained in response to the ignitability value of the combustion mixture. The second fuel amount is reduced, which results in the substitution ratio decreasing as well, and the ignitability value of the combustion mixture increases. In the example of FIG. 7, the second fuel is ammonia.

At t2, the ignitability value is within the determined ignitability value range. Between t2 and t3, the parameters are maintained in response to a load being held constant. At t3, the ignitability value begins to increase and between t3 and t4, the ignitability value of the combustion mixture is higher than the upper limit of the determined ignitability value range.

At t4, the first fuel amount is held constant. The second fuel amount is increased to a relatively high amount. The EGR routing is switched to a second travel path. The second travel path may include routing the EGR through an EGR passage to mix with intake air and enter the combustion chamber through an intake valve. Additionally or alternatively, the EGR may flow through an EGR cooler arranged in the EGR passage. The second fuel injection location is switched to include only the second location and the third location. The second fuel is no longer injected at the exhaust port. The second injection location is an intake port and the third injection location is the EGR passage. By injecting the second fuel into the intake port and the EGR passage, the EGR may be cooled. The combination of these adjusted operating parameters may result in a less ignitable combustion mixture. For example, the EGR may be cooled and carry water from the EGR cooler, which may further reduce the combustion mixture ignitability value. By injecting the second fuel into the EGR passage and the intake port, the second fuel may be less atomized than when injected into the exhaust port, further reducing the combustion mixture ignitability value.

Between t4 and t5, the combustion mixture ignitability value decreases. At t5, the combustion mixture ignitability value is within the determined ignitability value range. After t5, the operating parameters are maintained. As such, the In some examples, the combustion mixture may include another carbon-free fuel, such as hydrogen. When the ignitability value is less than the determined ignitability value range, the amount of hydrogen may be adjusted (e.g., increased). When the ignitability value is greater than the determined ignitability value range, the amount of hydrogen may be adjusted (e.g., decreased). At any rate, EGR routing and carbon-free fuel and/or alternative fuel adjustments may occur in response to an ignitability value of a combustion mixture.

In some embodiments, additionally or alternatively, an amount of EGR may adjust ignitability value. For example, as the amount of EGR provided to the combustion chamber increases, an amount of fuel direct injected into the combustion chamber may also increase to compensate for reduced combustion stability and/or ignitability value caused by increased cylinder dilution. Combustion conditions may be more stabilized by prioritizing direct injection as more EGR flows to the combustion chamber. If the increased mass flow of EGR is mixed with a carbon-free fuel via port-injection or EGR passage injection, then an atomization of fuels in the combustion chamber may be reduced and an overall ignitability value of the combustion mixture may also be reduced. Additionally or alternatively, the EGR may improve atomization of the second fuel being port-injected via enhanced atomization of the second fuel. During conditions where multi-fuel combustion is occurring and ignitability is relatively low, the amount of EGR may be increased to atomize the second fuel and to supply enough EGR to atomize the first fuel direct injected to the combustion chamber. In this way, one or more may be made of an amount of the second fuel injected, a number of second fuel injections, a location of the injection(s) of the second fuel, an EGR routing, and an EGR amount in response to an ignitability value of a combustion mixture during multi-fuel operation of the engine.

The disclosure provides support a method including injecting a first fuel to a combustion chamber via a direct injector positioned to inject directly into the combustion chamber, injecting a different, second fuel to the combustion chamber via an exhaust port injector positioned to inject toward an exhaust valve of the combustion chamber, and combusting the first and second fuels together in the combustion chamber. A first example of the method further includes adjusting an opening timing and/or a closing timing of the exhaust valve to re-ingest exhaust gases while injecting the second fuel, wherein the second fuel is gaseous. A second example of the method, optionally including the first example, further includes where the second fuel is a reductant, further comprising supplying reductant to a catalyst via the exhaust port injector or a catalyst injector. A third example of the method, optionally including one or more of the previous examples, further includes where additionally injecting the second fuel into an exhaust gas recirculation (EGR) passage via an EGR passage injector. A fourth example of the method, optionally including one or more of the previous examples, further includes determining an amount of the second fuel to be injected into the EGR passage based at least in part on a desired substitution rate. A fifth example of the method, optionally including one or more of the previous examples, further includes cooling EGR by injecting the second fuel via the EGR passage injector. A sixth example of the method, optionally including one or more of the previous examples, further includes where injecting the first fuel comprises a first injection during an intake stroke and a second injection during a compression stroke.

The disclosure provides support for a system including a first fuel system fluidly coupled to direct injectors of a plurality of cylinders and configured to supply a first fuel, a second fuel system fluidly coupled to intake port injectors, exhaust port injectors, an exhaust gas recirculation (EGR) passage injector, and a catalyst injector, the second fuel system configured to supply a second fuel different than the first fuel, and a controller with instructions stored on non-transitory memory that when executed cause the controller to determine a desired substitution rate, determine a desired EGR flow rate, and inject the second fuel from the second fuel system via one or more of the intake port injectors, the exhaust port injectors, and the EGR passage injector based on the desired substitution rate and the desired EGR flow rate. A first example of the system further includes where the instructions further cause the controller to inject a first fuel from the first fuel system via the direct injectors during an intake stroke and a compression stroke of the plurality of cylinders, and wherein the second fuel is ammonia. A second example of the system, optionally including the first example, further includes where the instructions further cause the controller to adjust an exhaust valve timing of an exhaust valve of a cylinder of the plurality of cylinders. A third example of the system, optionally including one or more of the previous examples, further includes where adjusting the exhaust valve timing comprises at least one of delaying the exhaust valve timing by opening the exhaust valve later in an exhaust stroke and closing the exhaust valve during an intake stroke in response to the exhaust port injectors injecting the second fuel. A fourth example of the system, optionally including one or more of the previous examples, further includes where adjusting the exhaust valve timing comprises delaying the exhaust valve timing by closing the exhaust valve in an intake stroke in response to the exhaust port injectors injecting the second fuel. A fifth example of the system, optionally including one or more of the previous examples, further includes where the EGR passage injector is arranged in an EGR passage upstream of a cooler, and wherein a coolant of the cooler is the second fuel. A sixth example of the system, optionally including one or more of the previous examples, further includes where the catalyst injector is arranged upstream of a selective catalytic reduction device. A seventh example of the system, optionally including one or more of the previous examples, further includes where the instructions further cause the controller to determine a desired EGR cooling and a desired exhaust valve cooling, and wherein an amount of the second fuel injected by the EGR passage injector and the exhaust port injectors is adjusted based on the desired EGR cooling and the desired exhaust valve cooling.

The disclosure provides support for a method including premixing ammonia and exhaust gas recirculation (EGR) and flowing the premixed ammonia and EGR to a cylinder of an engine. A first example of the method further includes flowing the premixed ammonia and EGR through an exhaust valve of the cylinder. A second example of the method, optionally including the first example, further includes premixing comprises injecting ammonia toward an exhaust valve of the cylinder, and wherein the method further comprises opening the exhaust valve during a late stage of an exhaust stroke and closing the exhaust valve during an intake stroke of the cylinder. A third example of the method, optionally including one or more of the previous examples, further includes premixing comprises injecting ammonia into a portion of an EGR passage adjacent to an intersection between an exhaust passage and the EGR passage. A fourth example of the method, optionally including one or more of the previous examples, further includes transferring thermal energy from the exhaust gas in the EGR to the ammonia.

The disclosure provides support for a method including injecting a first fuel to a combustion chamber via a direct injector positioned to inject directly into the combustion chamber, injecting a different, second fuel to the combustion chamber via an exhaust port injector positioned to inject toward an exhaust valve of the combustion chamber, and adjusting an exhaust gas recirculation (EGR) routing in response to an ignitability value of a combustion mixture that includes at least the first fuel, the second fuel, and air. A first example of the method further includes where the EGR routing comprising providing EGR via one or more of an EGR passage, a donor cylinder, re-ingestion, and retention, and wherein routing EGR through a cooler of the EGR passage adjusts an amount of water in the combustion mixture. A second example of the method, optionally including the first example, further includes adjusting one or more of an exhaust valve timing and an exhaust port injector timing based at least in part on the ignitability value. A third example of the method, optionally including one or more of the previous examples, further includes where injecting the first fuel comprises multiple injections of the first fuel during a combustion cycle of the combustion chamber, further comprising adjusting one or more of the multiple injections of the first fuel in response to the ignitability value. A fourth example of the method, optionally including one or more of the previous examples, further includes injecting the second fuel via one or more of an intake port injector and an EGR passage injector. A fifth example of the method, optionally including one or more of the previous examples, further includes where the first fuel is a carbon-containing fuel and the second fuel is a carbon free fuel. A sixth example of the method, optionally including one or more of the previous examples, further includes where the first fuel comprises one or more of diesel, hydrogenation-derived renewable diesel (HDRD), biodiesel, syn-gas, alcohol, gasoline, kerosene, ether, and natural gas, and wherein the second fuel comprises ammonia and hydrogen. A seventh example of the method, optionally including one or more of the previous examples, further includes adjusting the exhaust valve timing in response to the ignitability value of the combustion mixture and a reductant demand of an aftertreatment device. An eighth example of the method, optionally including one or more of the previous examples, further includes adjusting an amount of the second fuel injected by the exhaust port injector in response to one or more of the ignitability value of the combustion mixture, a pH of the EGR, and a reductant demand of an aftertreatment device.

The disclosure provides further support for a system including a first fuel system configured to supply a first fuel directly into a combustion chamber, a second fuel system configured to supply a second fuel outside of the combustion chamber, and a controller with instructions stored on non-transitory memory that when executed cause the controller to select a substitution ratio based on an engine load and an exhaust gas recirculation (EGR) demand, and adjust an ignitability value of a combustion mixture comprising the first fuel and the second fuel via adjusting an exhaust valve timing. A first example of the system further includes where the instructions further cause the controller to adjust one or more of an inject timing of the first fuel, an inject timing of the second fuel, an EGR routing, an injection location of the second fuel, an injection amount of the first fuel, and an injection amount of the second fuel. A second example of the system, optionally including the first example, further includes where the combustion mixture comprises at least one of ammonia or hydrogen. A third example of the system, optionally including one or more of the previous examples, further includes where the instructions further cause the controller to adjust an injection timing via adjusting a number of injection of a carbon-containing fuel during an intake stroke and a compression stroke. A fourth example of the system, optionally including one or more of the previous examples, further includes where the instructions further cause the controller to adjust an injection location of the second fuel in response to an EGR routing, the EGR routing comprising providing EGR via one or more of an EGR passage, a donor cylinder, re-ingestion, and retention. A fifth example of the system, optionally including one or more of the previous examples, further includes where one of the first fuel and the second fuel is a gaseous fuel.

The disclosure provides additional support for a system of a vehicle including an engine comprising a cylinder including at least one intake valve and at least one exhaust valve, a first fuel system operable to deliver a first fuel to the cylinder via a plurality of direct injectors, a second fuel system operable to deliver a second fuel to the cylinder via a plurality of second fuel injectors located at different sections of an intake system and an exhaust gas recirculation (EGR) portion of an exhaust system, and a controller with computer-readable instructions stored on non-transitory memory thereof that when executed enable the controller to select a substitution ratio based on an engine load, and adjusting an EGR routing and a location of an injection of the second fuel in response to an ignitability value of a combustion mixture of the cylinder. A first example of the system further includes where the plurality of second fuel injectors comprise an intake port injector, an exhaust port injector, and an EGR passage injector, and wherein a selection of the location of the injection is in further response to an EGR temperature, a boost air temperature, an engine temperature, an aftertreatment device reductant demand, and the EGR routing, wherein the aftertreatment device is downstream of the engine. A second example of the system, optionally including the first example, further includes where the EGR routing comprising providing EGR via one or more of an EGR passage, a donor cylinder, re-ingestion, and retention, and wherein routing EGR through a cooler of the EGR passage adjusts an amount of water in the combustion mixture, and wherein the instructions enable the controller to select re-ingestion in response to ignitability value being less than a determined range and to select routing through the cooler of the EGR passage in response to the ignitability value being greater than the determined range. A third example of the system, optionally including one or more of the previous examples, further includes where the instructions further enable the controller to adjust an amount of second fuel injected at the different portions of the intake and exhaust systems. A fourth example of the system, optionally including one or more of the previous examples, further includes where the instructions further enable the controller to maintain an amount of the first fuel and adjust only the EGR routing and the location, a number, and an amount of the injection of the second fuel.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   injecting a first fuel to a combustion chamber via a direct injector positioned to inject the first fuel directly into the combustion chamber;
   injecting a different, second fuel to the combustion chamber via an exhaust port injector positioned to inject the second fuel toward, or proximate to, an exhaust valve of the combustion chamber; and
   adjusting an exhaust gas recirculation (EGR) routing, or amount of exhaust gas supplied into the combustion chamber, based at least in part in response to an ignitability value of a combustion mixture comprising at least the first fuel, the second fuel, and air.

2. The method of claim 1, wherein the EGR routing adjusting comprises providing EGR via one or more of an EGR passage, a donor cylinder, re-ingestion, and retention, and routing EGR through a cooler of the EGR passage adjusts an amount of water in the combustion mixture.

3. The method of claim 1, further comprising adjusting one or more of an exhaust valve timing and a port injector timing based on the ignitability value.

4. The method of claim 1, wherein injecting the first fuel comprises multiple injections of the first fuel during a combustion cycle of the combustion chamber, further comprising adjusting one or more of the multiple injections of the first fuel in response to the ignitability value.

5. The method of claim 1, further comprising injecting the second fuel is via one or more of an intake port injector and an EGR passage injector.

6. The method of claim 1, wherein the first fuel is a carbon-containing fuel and the second fuel is a carbon-free fuel.

7. The method of claim 1, wherein the first fuel comprises one or more of diesel, hydrogenation-derived renewable diesel (HDRD), biodiesel, syn-gas, alcohol, gasoline, kerosene, ether, and natural gas, and wherein the second fuel comprises ammonia and hydrogen.

8. The method of claim 1, further comprising adjusting the exhaust valve timing in response to the ignitability value of the combustion mixture and a reductant demand of an aftertreatment device.

9. The method of claim 1, further comprising adjusting an amount of the second fuel injected by the exhaust port injector in response to one or more of the ignitability value of the combustion mixture, a pH of the EGR, and a reductant demand of an aftertreatment device.

10. A system, comprising:
a first fuel system configured to supply a first fuel directly into a combustion chamber;
a second fuel system configured to supply a second fuel from outside of the combustion chamber and subsequently into the combustion chamber; and
a controller with instructions stored on non-transitory memory that when executed cause the controller to:
determine a substitution ratio based at least in part on an engine load and an exhaust gas recirculation (EGR) demand; and
adjusting an exhaust valve timing to control an ignitability value of a combustion mixture comprising the first fuel and the second fuel.

11. The system of claim 10, wherein the instructions further cause the controller to adjust one or more of an injection timing of the first fuel, an inject timing of the second fuel, an EGR routing, an injection location of the second fuel, an injection amount of the first fuel, and an injection amount of the second fuel.

12. The system of claim 10, wherein the combustion mixture comprises at least one of ammonia, methanol, ethanol, or hydrogen.

13. The system of claim 10, wherein the instructions further cause the controller to adjust an injection timing via adjusting a number of injections of a carbon-containing fuel during an intake stroke and a compression stroke.

14. The system of claim 10, wherein the instructions further cause the controller to adjust an injection location of the second fuel in response to an EGR routing, the EGR routing comprising providing EGR via one or more of an EGR passage, a donor cylinder, re-ingestion, and retention.

15. The system of claim 10, wherein one of the first fuel and the second fuel is a gaseous fuel.

16. A system of a vehicle, comprising:
an engine comprising a cylinder including at least one intake valve and at least one exhaust valve;
a first fuel system operable to deliver a first fuel to the cylinder via a direct injector;
a second fuel system operable to deliver a second fuel to the cylinder via a second fuel injector located at a different intake system section from the direct injector, and an exhaust gas recirculation (EGR) portion of an exhaust system that is configured to provide exhaust gas to the cylinder; and
a controller with computer-readable instructions stored on non-transitory memory thereof that when executed enable the controller to:
select a substitution ratio of the first fuel relative to the second fuel based at least in part on an engine load; and
adjust an EGR routing, or an amount of exhaust gas for an injection with the second fuel, in at least partial response to an ignitability value of a combustion mixture in the cylinder that includes the first fuel and the second fuel.

17. The system of claim 16, wherein the second fuel injector is one of a plurality of second fuel injectors, and the plurality comprises one or more of an intake port injector, an exhaust port injector, and an EGR passage injector, and
a selection of which injector, corresponding to a selection of a location of the injection, is in at least partial response to a sensed engine operating parameter selected from:
an EGR temperature, a boost air temperature, an engine temperature, an aftertreatment device reductant demand, and an EGR routing configuration.

18. The system of claim 16, wherein the EGR routing comprising providing exhaust gas via one or more of an EGR passage, a donor cylinder, re-ingestion, and retention, and
routing exhaust gas through a cooler of the EGR passage adjusts an amount of water in the combustion mixture, and the instructions enable the controller to select re-ingestion in response to the ignitability value being less than a value in a determined range, and to select routing through the cooler of the EGR passage in response to the ignitability value being greater than a value being more than the determined range.

19. The system of claim 16, wherein the instructions further enable the controller to adjust an amount of second fuel injected at the different portions of the intake and exhaust systems.

20. The system of claim 16, wherein the instructions further enable the controller to maintain an amount of the first fuel and adjust only the EGR routing and the location, a number, and an amount of the injection of the second fuel.

* * * * *